United States Patent [19]

Metz

[11] Patent Number: 4,463,921

[45] Date of Patent: Aug. 7, 1984

[54] GAS JET STEERING DEVICE AND METHOD MISSILE COMPRISING SUCH A DEVICE

[75] Inventor: Pierre Metz, Paris, France

[73] Assignee: Thomson-Brandt, Paris, France

[21] Appl. No.: 370,100

[22] Filed: Apr. 20, 1982

[30] Foreign Application Priority Data

Apr. 21, 1981 [FR] France ................. 81 07915

[51] Int. Cl.³ .............................. F42B 15/02
[52] U.S. Cl. ...................... 244/3.22; 239/265.19; 239/265.27; 239/265.29; 239/265.31; 60/230
[58] Field of Search ............... 244/3.21, 3.22; 239/265.19, 265.27, 265.29, 265.31; 60/264, 271, 254, 261, 39.53, 230, 232, 245

[56] References Cited

U.S. PATENT DOCUMENTS 2,726,510  12/1955  Goddard .
3,245,620   4/1966  McEwen .
3,273,825   9/1966  Kerner .
3,302,890   2/1967  Silver ................. 239/265.31
3,927,693  12/1975  Johnston .
4,011,720   3/1977  Kirschner ................. 60/254

FOREIGN PATENT DOCUMENTS 568066  12/1932  Fed. Rep. of Germany .
1291206   4/1962  Fed. Rep. of Germany .
1232030   1/1967  Fed. Rep. of Germany .
2815087  12/1978  Fed. Rep. of Germany .
1073075   6/1967  United Kingdom .

*Primary Examiner*—Donald P. Walsh
*Attorney, Agent, or Firm*—Oblon, Fisher, Spivak, McClelland & Maier

[57] ABSTRACT

A steering device comprising an annular element having N exhaust nozzles and a rotary element disposed coaxially inside said annular element; the rotary element comprising M gas passageways may be positioned in MN discrete directions so as to provide a transverse thrust force orientated in one of the steering planes.

12 Claims, 12 Drawing Figures

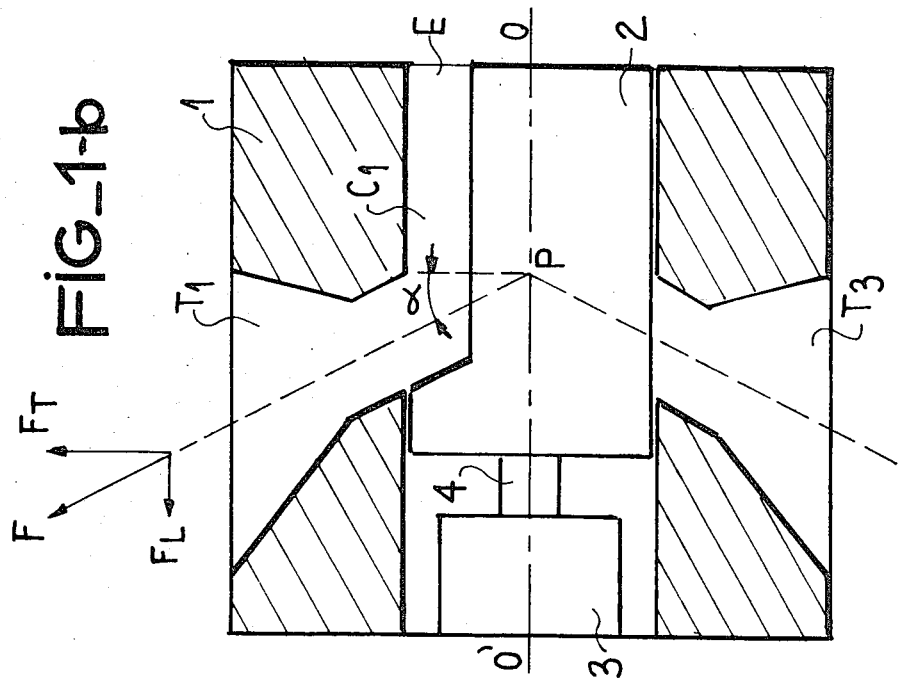
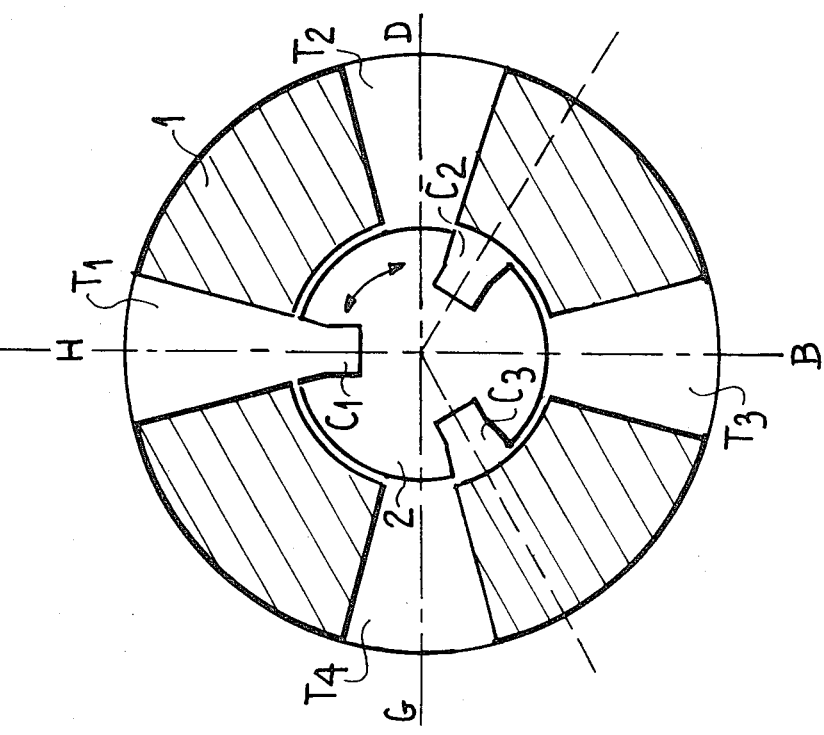

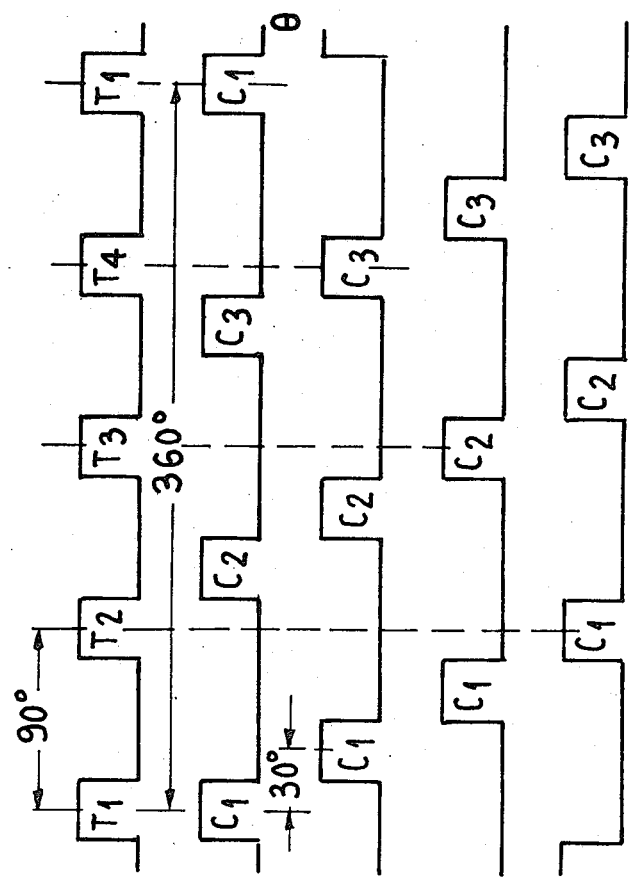

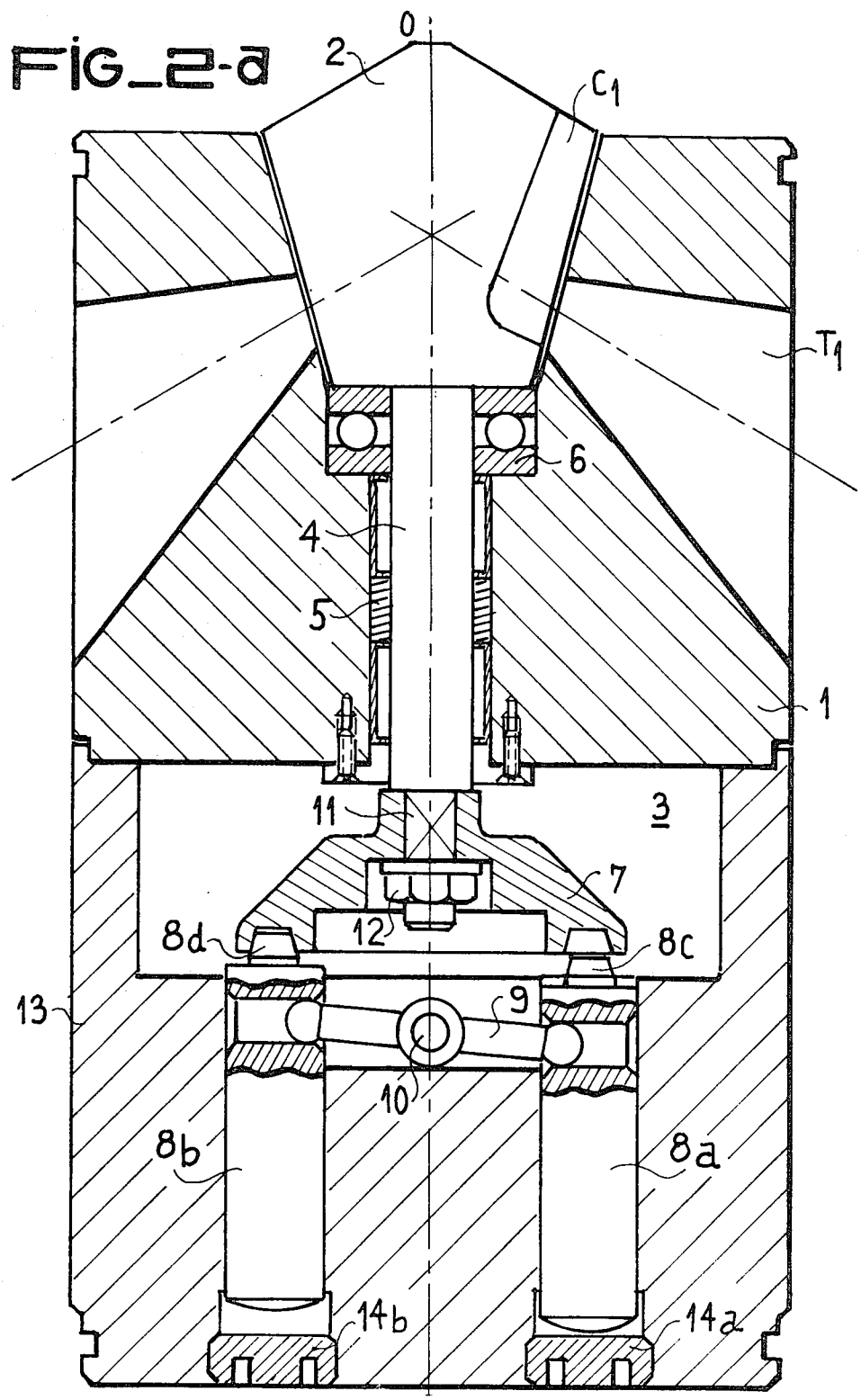

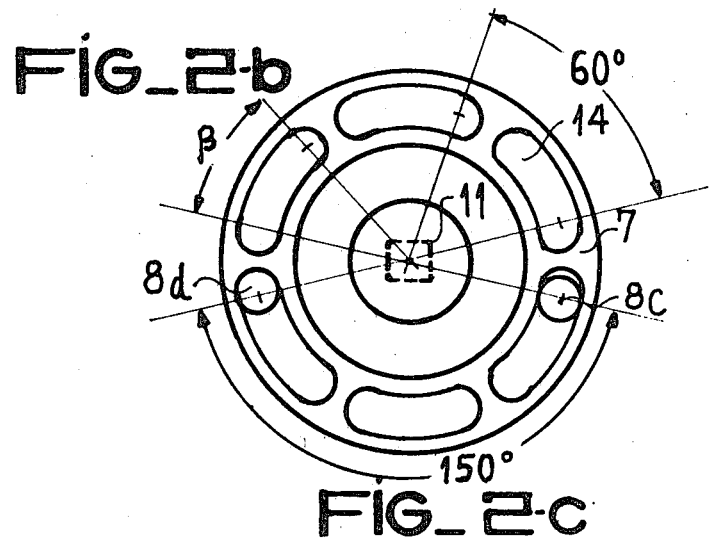
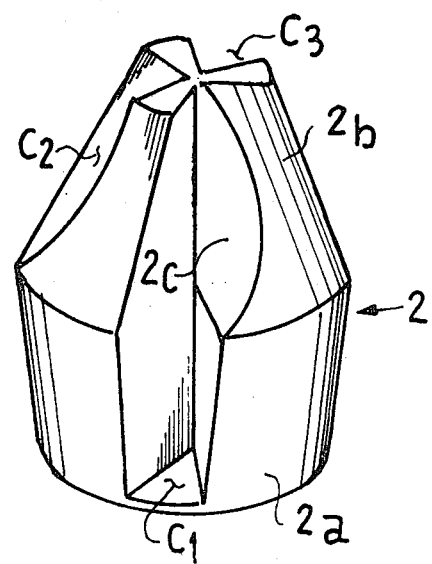

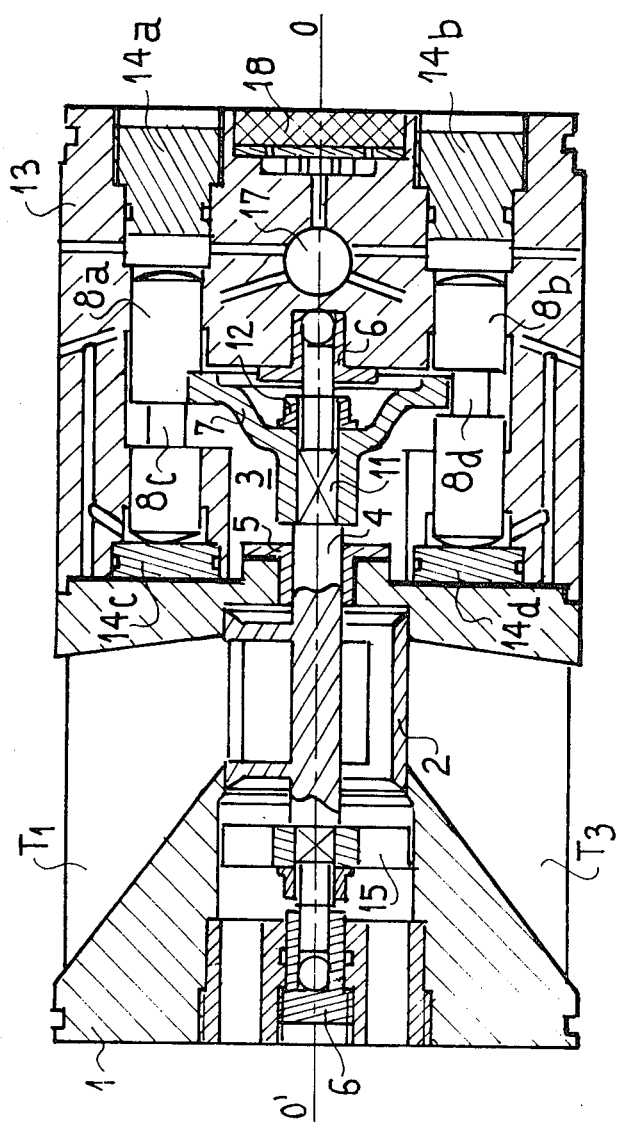

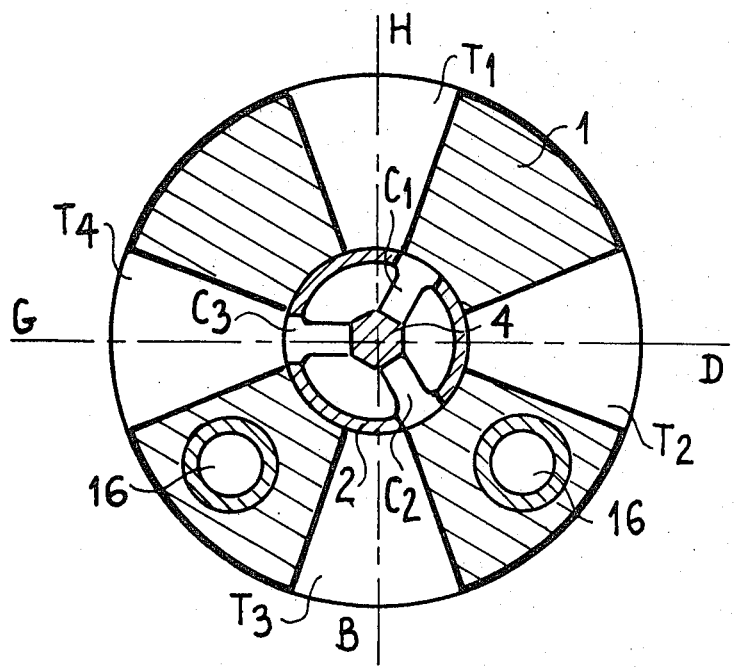
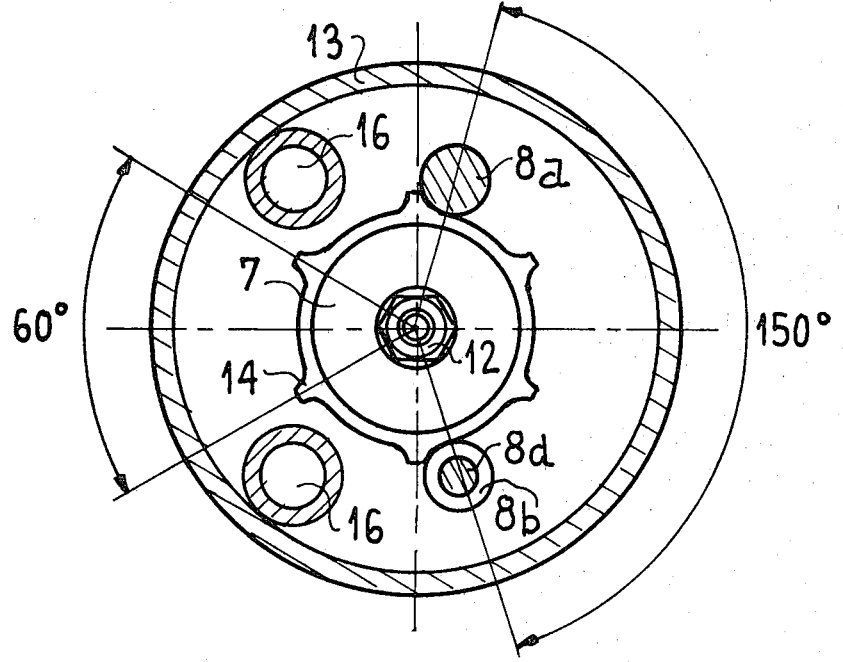

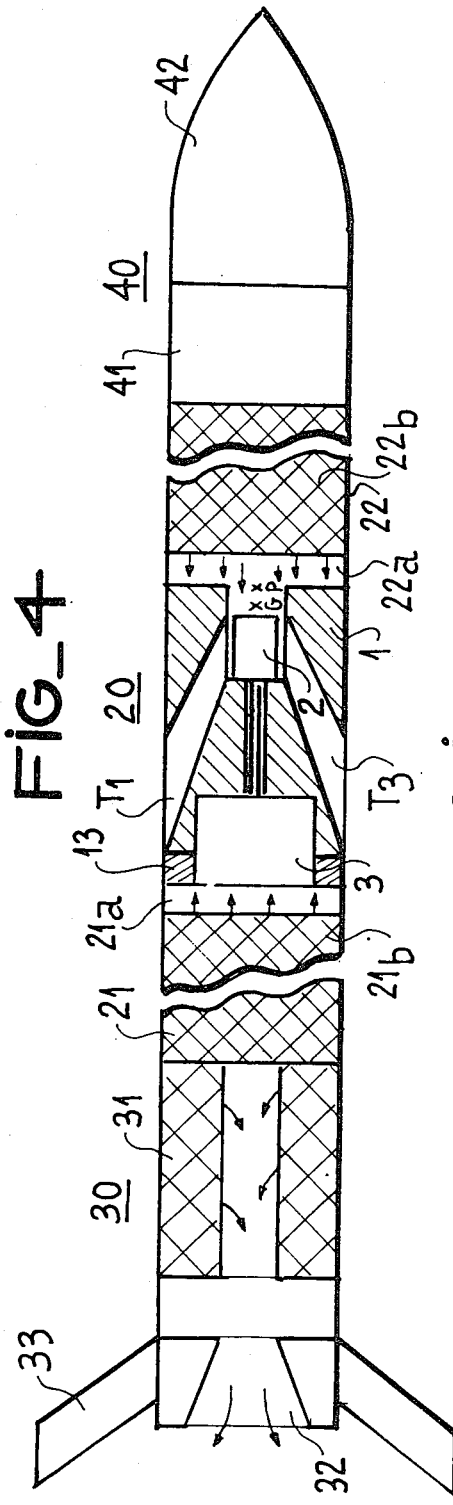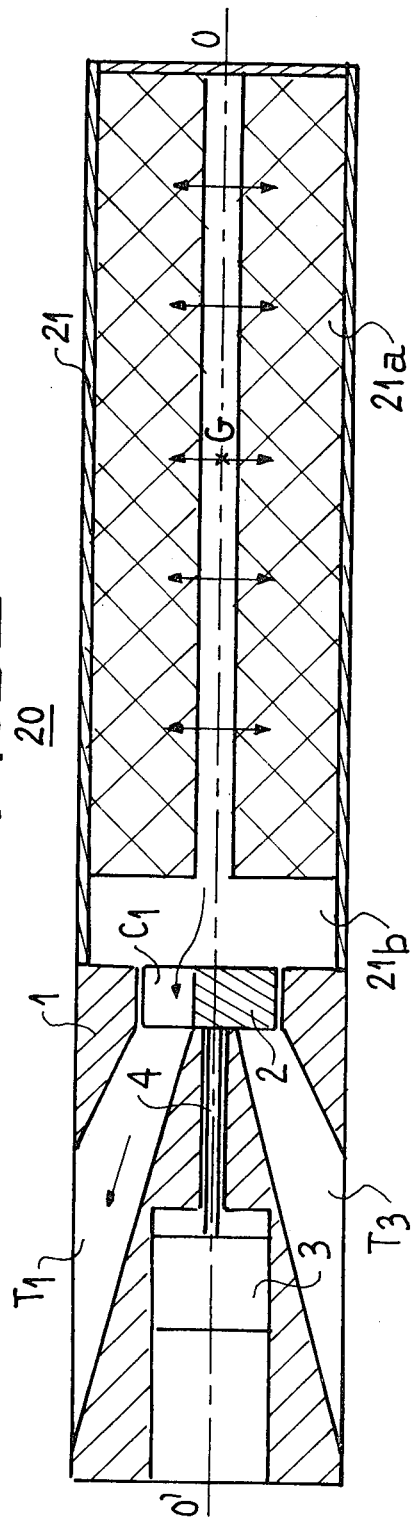

GAS JET STEERING DEVICE AND METHOD MISSILE COMPRISING SUCH A DEVICE

BACKGROUND OF THE INVENTION

The invention relates to a steering device using gas jets which create thrust forces in directions determined by guidance commands; it also relates to a missile equipped with such a device.

A gas jet steering device intended more specifically for modifying the flight path of a projectile or missile comprises a set of fixed nozzles disposed in a ring at the periphery of the body of the missile and a primary energy source which generates a gas flow, generally with a continuous delivery rate. Between the inlets of the nozzles for exhausting the gas flow and the outlet of the gas source, there are disposed means for switching the gas flow into one or simultaneously into several nozzles in keeping with the guidance commands available on board the missile. Furthermore, in some applications, it is desirable to have available simultaneously a longitudinal thrust force for maintaining the cruising speed of the missile and a transverse force for modifying the flight direction of this missile.

It is known, more especially from French patent No. 77 10755, filed on Apr. 8th, 1977 in the name of the Applicant, to construct a gas jet steering device in which distribution or switching means are provided for directing the gas flow towards given exhaust nozzles. In a first embodiment described, corresponding to a single steering plane, the device comprises two fixed diametrically opposite nozzles; the distribution means is formed by a mobile vane disposed in the divergent conduits for supplying the nozzles with gas flow; this mobile vane is hinged about an axis perpendicular to the plane containing the nozzles and is actuated by a pneumatic jack so as to swivel alternately towards one nozzle or the other. In a second embodiment described in this patent, the steering device comprises a set of four fixed nozzles diametrically opposite in pairs, each of the pairs of nozzles being situated in the two orthogonal steering planes; the means for distributing the gas flow is a four branch vane hinged to a central swivel joint and disposed in the divergent conduits for supplying the nozzles with gas flow, so that two adjacent nozzles are simultaneously open whereas the other two nozzles remain closed.

The steering device of the invention relates more particularly to this second embodiment of the prior art which presents the following drawbacks: firstly, the transverse thrust force results from the geometrical sum of two orthogonal elementary forces resulting in a weight penalty on the gas flow generator and secondly manufacture of the four-branch vane hinged to a swivel joint raises technological difficulties.

The aim of the invention is to eliminate the above-mentioned drawbacks which are inherent in the gas jet steering devices of the prior art.

SUMMARY OF THE INVENTION

To attain this aim, a steering device in accordance with the invention comprises an annular element having N exhaust nozzles situated in the steering planes of the missile and a primary energy source which supplies a continuous gas flow over a lateral face of a rotary element disposed concentrically within the annular nozzle carrying element, this rotary element comprising M channels for passage of the gas flow therethrough and positioning means providing MN stable discrete positions; the number N of exhaust nozzles being different from the number M of gas flow channels.

Another object of the invention is a steering device in which the means for positioning the rotary element comprise a means for causing rotation of the rotary element by the throughflow of gas and a means for stopping at MN discrete positions.

Another aim of the invention is a steering device in which the rotation of the rotary element does not significantly disturb the delivery rate of the gas flow supplied by the source.

BRIEF DESCRIPTION OF THE DRAWINGS

Other characteristics and advantages which the invention provides will appear from the detailed description which follows made with reference to the accompanying figures; in these figures:

FIG. 1a represents, in a simplified schematical form, a transverse view of the steering device of the invention, FIG. 1b shows, in a simplified schematical form, a longitudinal view of the steering device of the invention, FIG. 1c shows, in the form of a graph, the relative position of the exhaust nozzles and of the gas passage channels depending on the angular position $\theta$ of the rotary element;

FIG. 1d gives, in the form of a table, the opening sequence of the exhaust nozzles, FIG. 2a shows, in a longitudinal sectional view, one embodiment of a steering device in accordance with the invention;

FIG. 2b shows constructional details of the notched disk of the means for positioning the rotary element, FIG. 2c is a perspective view of the rotary element;

FIG. 3a shows, in a longitudinal sectional view, another embodiment of the steering device of FIG. 2a, FIG. 3b shows constructional details of the rotary element, FIG. 3c shows constructional details of the notched disk of the means for positioning the rotary element, FIG. 4 shows, in a sectional view, a guided missile comprising a steering device in accordance with the invention;

FIG. 5 shows, in a longitudinal sectional view, a steering device comprising a single gas generator.

DESCRIPTION OF THE PREFERRED EMBODIMENTS

In the FIGS. 1a and 1b there is shown, in a simplified schematical form respectively in longitudinal and cross-sectional views, a gas jet steering device in accordance with the invention; this device comprising the following elements:

an annular element 1 having four fixed nozzles, $T_1$ to $T_4$, and evenly spaced apart so as to form two pairs of nozzles, each of the pairs being contained in the respective steering planes H-B and D-G; the direction of the thrust force F of these nozzles being able to be inclined an angle $\alpha$, a rotary element 2 placed coaxially inside the annular element 1 and comprising three gas flow passage channels whose common inlets E are supplied with the gas flow provided by a gas generator not shown; this rotary element is free to rotate in both directions indicated by the double arrow, about the longitudinal axis 0,0' of the device and with the angular relative spacing of these gas flow passageways being constant.

A positioning means 3 which allows the rotary element 2 to be positioned in twelve directions for opening sequentially one of the four nozzles and closing the other three; this positioning means is integral with the annular element 2 and is coupled to the rotary element by means of a longitudinal shaft 4.

In FIGS. 1a and 1b it can be seen that, in the relative angular position shown of the rotary element 2 and of nozzle $T_1$, the whole of the gas flow passes through channel $C_1$ and this nozzle $T_1$; the result is an oblique thrust force F applied at point P located on the longitudinal axis 0,0' of the device; the components $F_L$ and $F_T$ of this force F corresponding respectively to the longitudinal and transverse thrust forces.

FIG. 1c shows, in the form of a graph, the relative angular position of the exhaust nozzles $T_1$ to $T_4$ and of the gas flow passageways $C_1$ to $C_3$ depending on the angular position $\theta$ of the rotary element. The relative angular spacing of the nozzles is equal to 90° and the relative angular spacing of the passageways is equal to 120°. If we consider the two possible directions of rotation of rotary element 2, the opening sequences of the nozzles depending on the angular position of the rotary element are given in the form of a table in FIG. 1d.

Generally, the angular spacing of the nozzles is equal to $2\pi/N$ if N is the number of nozzles and the relative angular spacing of the passageways is equal to $2\pi/M$ if M is the number of passageways. It can be shown, that, with M and N being different integers and, for some particular values of M and N, a rotation through an angle $2\pi/MN$ of the rotary element ensures opening of the adjacent nozzle. In particular, the value of M may differ by unity from the value of N; in the above example, in which N is equal to four, however, M may assume the following values: 3,5,7,9,11 etc...

In the case of using a gas generator in which the energy source is a solid propergol situated in a combustion chamber, desirably the gas flow delivery rate should not be disturbed by rotation of the rotary element and for this it is necessary for the angular openings of the inlet of the nozzles and the outlet of the passageways be equal to the value $2\pi/MN$. The angle of inclination of the direction of the thrust force F allows, during construction, the ratio of the longitudinal $F_L$ and transverse $F_T$ forces supplied by the steering device to be fixed. The means 3 for positioning the rotary element 2 may be of the electric, hydraulic or pneumatic type and, in this latter type, may take their operating energy from the transverse gas flow.

FIG. 2a shows, in a longitudinal sectional view, one embodiment of the steering device already described with reference to FIGS. 1a to 1c; in this FIG. 2a, the gas generator which does not form part of the invention is not shown and will not be described since it is known per se. This steering device comprises a solid annular element 1 having four mutually orthogonal exhaust nozzles and only the two diametrically opposite nozzles appear in the figure. The rotary element 2 is disposed coaxially in the annular element 1 and comprises three gas passageways, only passage $C_1$ appearing in the figure; the outlet of this passageway $C_1$ is in coincidence with the inlet of nozzle $T_1$, the other three nozles $T_2$ to $T_4$ being closed by the rotary element since the relative angular spacing of the passageways is equal to 120°, the rotary element 2 also comprises an output shaft 4, free to rotate inside a bearing 5. The rotary element is held, under the force of the pressure of the through-flowing gas, in abutment against a ball thrust bearing 6. The means 3 for positioning the rotary element 2 comprise a means for causing rotation provided by the gas flow passageways, as will be described further on, and a means for stopping in twelve directions, provided by an escape mechanism comprising a notched disk 7 and a pair of single acting pneumatic jacks 8a an 8b synchronized by means of a link 9 hinged about an axis 10 perpendicular to the longitudinal axis 0,0' of the device; these jacks are provided with fingers 8c and 8d capable of engaging in the notches of disk 7. The relative position of the notched disk 7 and of the rotary element is perfectly referenced through a fitment 11 and the disk is firmly held on the output shaft 4 by means of a threaded nut 12. The pneumatic jacks 8a and 8b are physically integral with the annular element 1 through a solid cylindirical element 13 which is fitted and correctly positioned on this annular element. In this cylindrical jack carrying element 13 are provided housings for jacks 8a and 8b, these housings being closed by hermetically sealed plugs 14a and 14b. The pneumatic jacks may be controlled by means of conventional electromagnetic valves and the operating energy may be taken from the transverse gas flow. The control members for the jacks, since they are known per se, will not be further described.

FIG. 2b shows one embodiment of the notches in disk 7. This disk comprises six hollow impressions 14, circular in shape and all identical, spaced angularly equally apart by an angle of 60°, the angular opening $\beta$ of these impressions being substantially greater than an angle of 30°. The finger 8c and 8d of the pneumatic jacks are spaced angularly apart by an angle equal to 150°, so as to provide twelve stop positions for the rotary element.

FIG. 2c shows a perspective view of the rotary element 2, showing more particularly one embodiment of the gas passageways. This rotary element is formed from two truncated cone shape parts 2a and 2b, part 2a facing the inlets of the exhaust nozzles and part 2b forming more especially the common inlet for the gas passageways. In this embodiment, passageways $C_1$ and $C_3$ have a triangular section and comprise, at their inlet, a land 2c which, under the action of the pressure of the gas flow, creates a rotational force of predetermined direction with, accordingly, a unidirectional opening sequence of the nozzles.

The annular element 1 and the rotary element 2 must be formed from a refractory material resisting the erosion of the gas flow, for example a material such as graphite or molybdenum. The jack carrying element 13 may be made from steel or else from a light alloy, providing that the housings for the pneumatic jacks 8a and 8b are properly treated.

FIG. 3a shows another embodiment of the steering device described with reference to FIGS. 2a to 2c. As previously mentioned, the device comprises: the annular element 1 with its four exhaust nozzles and rotary element 2 mounted coaxially in this annular element.

In this embodiment, the rotary element 2 has passing therethrough a shaft 4 which is mounted in a bearing 5 and held in place by means of two ball thrust bearings 6; moreover, the means for rotating this rotary element are provided by a turbine 15 and the means for stopping at the MN positions is provided by a notched wheel in combination with two double-acting pneumatic jacks 8a and 8b. These jacks comprise in their middle region a smaller diameter position 8c and 8d whose function will be explained further on and these jacks are mounted antisymmetrically. The energy for controlling the pneumatic jacks may be taken from the steering gas flow; to this end, the means for controlling the jacks comprise an electro-magnetic valve 17 supplied, through a filter 18, with a small fraction of the gas flow generated by the device.

FIG. 3b is a cross-sectional view showing the configuration of the three gas passageways $C_1$ to $C_3$. The rotary element 2, through which passes the rotational shaft 4, comprises three passageways $C_1$, $C_2$ and $C_3$ substantially rectangular in section. In this figure there are shown gas conduits 16 disposed between the nozzles, whose function is to couple in parallel two identical gas generators placed on each side of the steering device.

FIG. 3c shows, in a sectional view, the contructional details of the notched disk 7. This disk comprises at its periphery six stop notches 14, all identical and evenly spaced apart, which bear on the jacks 8a and 8b. With the angular spacing of these jacks equal to 150°, the disk provides twelve perfectly defined to stop positions.

FIG. 4 shows, in a simplified sectional view, a guided missile comprising a gas jet steering device such as described above. This missile, more especially designed for air-air combat comprises three main sections: a gas jet steering section 20 including two gas generators 21 and 22, coupled in parallel by gas conduits situated between the nozzles and not shown; a rear section comprising an acceleration impeller 31 with its exhaust nozzle 32 and a tail unit with fins 33, unfoldable or not, and a forward section 40 comprising the military charge 41 and a nose cone 42 containing the guidance head. The steering device 20 comprises four exhaust nozzles disposed in pairs in the two orthogonal steering planes of the missile; they are inclined rearwardly of the missile so as to provide therefor a longitudinal thrust component for maintaining the cruising speed conferred by the acceleration impeller. The gas generators 21 and 22, disposed on each side of the nozzles, each comprise a combustion chamber 21a and 22a and a solid propergol block 21b and 22b with its ignition means. The thrust center P of the steering device coincides substantially with the center of gravity G of the missile which, because of the symmetrical arrangement of the gas generators, does not undergo a translational movement during combusition of the propergol blocks 21b and 22b.

In another embodiment of this steering device by exhausting lateral gas jets, the rotary element 2 may be positioned continuously so as to vary the relative flow rate of the gases flowing through two adjacent nozzles while maintaining a constant gas flow. In this embodiment, the means 3 for positioning the rotary element 2 comprise a sensor for measuring the angular position of this rotary element and a motor, advantageously of the bidirectional type, physically coupled to this rotary element. This sensor for measuring the angular position and the motor for driving the rotary element form the elements of a servo-mechanism whose control signal is supplied from guidance signals available on board the missile.

FIG. 5 shows a variation of a gas jet steering device for a guided missile, comprising a single gas generator 21 and set of four very inclined nozzles. In this embodiment, the generator of the axial combustion type is substantially centered on the center of gravity G of the missile, and the gas flow passageways, such as $C_1$, of rotary element 2 are parallel to the longitudinal axis 0,0' of the device.

Thus the advantages provided by the gas jet steering device of the invention can be clearly seen and, more especially the fact that a small angular variation of the rotary element allows the gas flow to be switched from one of the nozzles to an adjacent nozzle.

The invention such as it has just been described is not limited to the embodiment of a steering device comprising four sequentially closable nozzles. It also applies to steering devices comprising two, three and more nozzles, by suitably choosing the number M of gas passageways. Furthermore, the section of these gas passageways may be adapted to the section of the nozzles; it may be triangular, rectangular, as described, but also circular or elliptic. The means for positioning the rotary element may be bidirectional if electric or pneumatic motors, of the step by step or continuous type, are used.

I claim:

1. A gas jet steering device for a guided missile, said get jet steering device comprising:
   (a) an annular element having a plurality N of equi-angularly spaced fixed exhaust nozzles inclined at and angle α to the longitudinal axis of the guided missile;
   (b) a rotary switching element disposed coaxially inside said annular element, said rotary switching element having a plurality M of gas flow passageways terminating in equi-angularly spaced outlets located in position to communicate with the inlets of said fixed nozzles, the integers M and N being different from one another; and
   (c) positioning means for rotating said rotary switch elements so as to selectively open and close communication between each of said M gas flow passageways and said N fixed nozzles, thereby steering the guided missile.

2. The steering device as recited in claim 1. wherein the integers M and N have no common factor except 1.

3. The steering device as recited in claim 1, wherein said means for positioning the rotary element comprises means for stopping the rotary element at N. M predetermined stable positions.

4. The steering device as recited in claim 1, wherein said rotary switching element does not move axially, but moves in pure rotary motion, whereby said positioning means causes sequential opening and closing of communication between said flow passageways and said fixed nozzles.

5. The steering device as recited in claim 1, wherein the sum of the angular openings of said equi-angularly spaced outlets in said rotary switching element is less than 360 degrees.

6. The steering device as recited in claim 5, wherein:
   (a) the inlets of said fixed nozzley are equi-angularly spaced in said annular element and
   (b) the sum of the angular openings of the inlets of said fixed nozzles in said annular element is less than 360 degrees.

7. The steering device as recited in claim 1, wherein:
   (a) the inlets of said fixed nozzley are equi-angularly spaced in said annular element and
   (b) the sum of the angular openings of the inlets of said fixed nozzles in said annular element is less then 360 degrees.

8. The steering device as claimed in claim 1, wherein the number N of exhaust nozzles differs by unity from the number of M of gas passageways.

9. The steering device as claimed in claim 1, wherein said means for positioning the rotary element comprise a means for causing rotation of this rotary element by means of the gas throughflow and a means for stopping at N.M predetermined stable positions.

10. The steering device as claimed in claim 9, wherein said stop means is an escape mechanism.

11. The steering means as claimed in claim 1, wherein said means for positioning the rotary element comprise a drive motor for causing rotation and a sensor for measuring the angular position of this rotary element.

12. A guided missile whose steering section comprises a steering device such as claimed in claims 8-11, 1 or 2, wherein said steering device is substantially centered on the center of gravity of the missile and comprises two gas generators placed on each side of said exhaust nozzles and coupled in parallel by at least one longitudinal conduit arranged between the exhaust nozzles.

* * * * *